(12) United States Patent
Wang et al.

(10) Patent No.: US 7,593,828 B2
(45) Date of Patent: Sep. 22, 2009

(54) METHOD AND APPARATUS FOR MONITORING A VARIABLE GEOMETRY INTAKE AIR COMPRESSOR DEVICE

(75) Inventors: Yue-Yun Wang, Troy, MI (US); Ibrahim Haskara, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/839,707

(22) Filed: Aug. 16, 2007

(65) Prior Publication Data

US 2009/0048802 A1 Feb. 19, 2009

(51) Int. Cl.
- *G01L 7/00* (2006.01)
- *G01L 9/00* (2006.01)
- *G01L 13/00* (2006.01)
- *G01M 15/00* (2006.01)
- *G06F 11/30* (2006.01)
- *G21C 17/00* (2006.01)
- *G06F 19/00* (2006.01)

(52) U.S. Cl. .................. 702/138; 702/35; 702/113; 702/182; 701/29

(58) Field of Classification Search ............... 702/35, 702/138, 113, 182; 701/29
See application file for complete search history.

(56) References Cited

U.S. PATENT DOCUMENTS

| | | | |
|---|---|---|---|
| 4,215,412 A * | 7/1980 | Bernier et al. ............... 701/100 |
| 4,502,437 A * | 3/1985 | Voss ............................. 123/357 |
| 4,612,770 A * | 9/1986 | Tadokoro et al. ............. 60/602 |
| 5,025,629 A * | 6/1991 | Woollenweber ............... 60/600 |
| 5,755,212 A | 5/1998 | Ajima |
| 6,298,299 B1 | 10/2001 | Itoyama et al. |
| 6,298,718 B1 * | 10/2001 | Wang ........................ 73/118.1 |
| 6,418,719 B2 * | 7/2002 | Terry et al. ................... 60/602 |
| 6,457,461 B1 | 11/2002 | Romzek |
| 6,508,242 B2 | 1/2003 | Jaliwala et al. |
| 6,652,414 B1 * | 11/2003 | Banks, III .................... 477/32 |
| 6,658,364 B2 | 12/2003 | Olin |
| 6,732,522 B2 | 5/2004 | Wright et al. |
| 7,043,914 B2 | 5/2006 | Ishikawa |
| 7,051,705 B2 * | 5/2006 | Doering ...................... 123/350 |
| 7,111,461 B2 * | 9/2006 | Richey ........................ 60/602 |
| 7,137,773 B1 * | 11/2006 | Mc Donald et al. ............ 415/1 |
| 2002/0144674 A1 * | 10/2002 | Wang et al. ............. 123/568.21 |
| 2004/0015287 A1 * | 1/2004 | Ilzuka et al. ................. 701/102 |
| 2004/0139949 A1 * | 7/2004 | Koseki et al. .......... 123/568.14 |
| 2005/0229909 A1 * | 10/2005 | Nakazawa et al. ..... 123/568.14 |
| 2008/0295513 A1 * | 12/2008 | Rollinger et al. .............. 60/602 |

FOREIGN PATENT DOCUMENTS

| JP | 11-093680 A | 4/1999 |
|---|---|---|
| JP | 19-192128 A | 8/2007 |
| KR | 10-2002-81277 A | 10/2002 |

* cited by examiner

*Primary Examiner*—Eliseo Ramos Feliciano
*Assistant Examiner*—Janet L Suglo

(57) ABSTRACT

A method for monitoring operation of a variable geometry turbocharger device includes monitoring exhaust gas pressure and vane position of the variable geometry turbocharger device. Exhaust pressure and vane position are estimated. Residual exhaust pressure and vane position are calculated based upon differences between the estimated and monitored exhaust gas pressures and vane positions. The turbocharger is determined operating properly based upon the exhaust pressure residual and the vane position residual.

19 Claims, 8 Drawing Sheets

US 7,593,828 B2

METHOD AND APPARATUS FOR MONITORING A VARIABLE GEOMETRY INTAKE AIR COMPRESSOR DEVICE

TECHNICAL FIELD

This invention pertains generally to internal combustion engines, and more specifically to monitoring systems therefor.

BACKGROUND OF THE INVENTION

Modern internal combustion engines are equipped with sophisticated systems to monitor and control various aspects of engine performance during ongoing operation, to meet operator demands for performance, including torque and fuel economy, and to satisfy government regulations related to emissions, safety, and fuel economy. Such systems include sensing devices and actuators connected to one or more control modules which execute computer programs to monitor and control engine operation during ongoing operation.

Exhaust pressure is an important parameter used by engine system designers. For example, emissions requirements have led to implementation of exhaust gas recirculation (EGR) systems combined with aftertreatment systems to reduce engine emissions. Control of exhaust gas recirculation requires an accurate determination of EGR mass flow. Such methods include calculating EGR flow from a gas flow equation through an orifice, and, determining a difference between charge air mass flow and fresh air mass flow. Both calculations use engine exhaust pressure as one of the input variables.

Some engines are equipped with turbocharger devices, especially variable geometry turbochargers, to increase power output, achieve emissions targets, and improve fuel economy. Various government regulations require monitoring of vehicle and powertrain components which affect emissions, with requirements to timely detect and identify faults in the components.

SUMMARY OF THE INVENTION

A method for monitoring operation of a variable geometry turbocharger device includes monitoring exhaust gas pressure and vane position of the variable geometry turbocharger device. Exhaust pressure and vane position are estimated. Residual exhaust pressure and vane position are calculated based upon differences between the estimated and monitored exhaust gas pressures and vane positions. The turbocharger is determined operating properly based upon the exhaust pressure residual and the vane position residual.

DETAILED DESCRIPTION OF AN EMBODIMENT OF THE INVENTION

Figure 1:
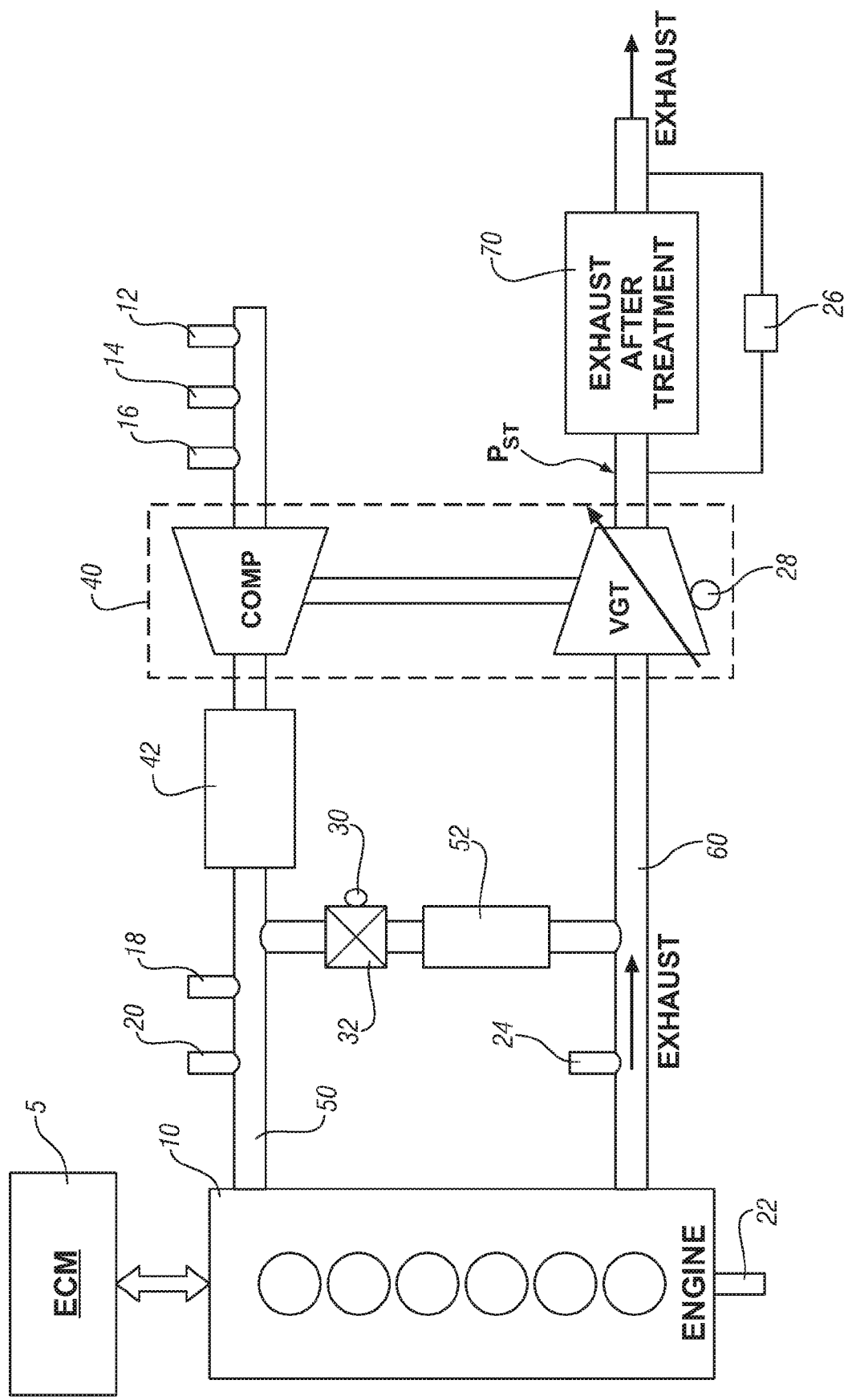
FIG. 1 is a schematic diagram of an exemplary engine system, in accordance with an embodiment of the present invention.

Referring now to the drawings, wherein the showings are for the purpose of illustrating one or more embodiments of the invention only and not for the purpose of limiting the same, FIG. 1 depicts an engine 10 and engine control module (ECM) 5 which has been constructed in accordance with an embodiment of the invention. The exemplary engine 10 comprises a conventional multi-cylinder internal combustion engine mechanized to operate in a compression-ignition configuration, although application of the invention is not meant to be limited to compression-ignition engine configurations. Engine system components include an intake air compressing device 40 comprising a variable geometry turbine device (VGT) and an air compressor (COMP), a charge air cooler 42, a recirculated exhaust gas (EGR) valve 32 and cooler 52, an intake manifold 50, and exhaust manifold 60, and an exhaust aftertreatment system 70, e.g., comprising an oxidation catalyst and a diesel particulate filter. Sensing devices are installed on the engine to monitor physical characteristics and generate signals which are correlatable to engine and ambient parameters. The sensing devices preferably comprise an ambient air pressure sensor 12, an ambient or intake air temperature sensor 14, and a mass air flow sensor 16, all which can be configured individually or as a single integrated device; an intake manifold air temperature sensor 18, and an intake manifold pressure sensor 20. There is an exhaust gas temperature sensor 24, a VGT position sensor 28 and an EGR valve position sensor 30. An engine speed sensor 22 monitors rotational speed of the engine. An exhaust gas pressure sensor 26 is adapted to monitor pressure output of the VGT of the intake air compressing device 40, into the exhaust system, depicted herein as monitoring a pressure drop across the exhaust aftertreatment system 70. Each of the sensing devices is signally connected to the ECM 5 to provide signal information which is transformed by the ECM to information representative of the respective monitored parameter. It is understood that this configuration is illustrative, not restrictive, including the various sensing devices being replaceable within functionally equivalent devices and algorithms and still fall within the scope of the invention. Furthermore, the intake air compressing device 40 may include turbocharger and supercharger devices within the scope of the invention.

The intake air compressing device 40 comprises a turbocharger device consisting of an air compressor positioned in the air intake of the engine which is driven by a turbine that is positioned in the exhaust gas flowstream. The turbine is a VGT having movable vanes in the turbine housing which direct flow of exhaust gases onto the turbine blades, with the angles of the vanes adjusted via an actuator. There is the VGT position command, $VGT_{cmd}$, output from the ECM to direct the angle of the vanes. The angle of the vanes is measured with a VGT position sensor 28. The ECM controls the angle of the vanes, which varies over the engine speed range to optimize air flow to the engine through the compressor portion of the VGT. At low engine speeds, the vanes are partially closed, reducing the turbo area and accelerating the exhaust gas towards the turbine at an acute angle, making the turbine spin quickly, thus reducing low-speed turbine lag. Recirculated exhaust gas, EGR, can be introduced to the intake through the compressor as well. At higher engine speeds, the exhaust flowrate is high, and the vanes are fully opened. There is a wastegate which permits bypass flow of some or all of the exhaust gas passed the turbine, and a wastegate position sensor (not shown). Some systems may eliminate the wastegate, depending upon the application.

The sensors are operative to provide parametric information, represented herein as follows:

| | |
|---|---|
| $\dot{M}_a$ | mass air flow |
| $T_{im}$ | intake manifold air temperature |
| $P_{im}$ | intake manifold pressure |
| $T_{am}$ | ambient air temperature |
| $P_{am}$ | ambient air pressure |
| $T_{ex}$ | exhaust gas temperature |
| $P_{ex}$ | exhaust gas pressure |
| $VGT_{ps}$ | VGT position |
| EGRps | EGR valve position |
| RPM | engine speed, and, |
| $\Delta P$ | exhaust aftertreatment delta pressure. |

The ECM 5 is an element of an overall vehicle control system, preferably comprising a distributed control module architecture operable to provide coordinated system control. The ECM is operable to synthesize pertinent information and inputs from the aforementioned sensing devices, and execute algorithms to control various actuators to achieve control targets, including such parameters as fuel economy, emissions, performance, driveability, and protection of hardware, as described hereinbelow. The ECM 5 is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. A set of control algorithms, comprising resident program instructions and calibrations, is stored in ROM and executed to provide the desired functions. Algorithms are typically executed during preset loop cycles such that each algorithm is executed at least once each loop cycle. Algorithms stored in the non-volatile memory devices are executed and are operable to monitor inputs from the sensing devices and execute control and diagnostic routines to control operation of the respective device, using predetermined calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

A method is preferably executed as one or more algorithms in the ECM 5, to monitor operation of the intake air compressing device, and specific components related thereto. The monitored components preferably consist of the vanes of the VGT, the VGT position sensor 28, the exhaust gas pressure sensor 26, and the wastegate bypass valve. The method comprises monitoring signals output from the exhaust gas pressure sensor 26 to determine exhaust gas pressure, $P_{ex}$ and monitoring output from the VGT position sensor 28 for the VGT to determine vane position, $VGT_{ps}$. Estimates for exhaust gas pressure and vane position are determined. An exhaust gas pressure residual and a vane position residual are calculated based upon differences between the estimated and monitored signals. It is determined that the turbocharger and its components are operating properly based upon the exhaust pressure residual and the wastegate position residual. A fault is identified in one of the components of the turbocharger based upon the exhaust pressure residual and the wastegate position residual. Specific control operations may be implemented to mitigate engine damage. This operation is now described in detail.

To estimate the exhaust pressure, $P_{ex\_est}$, an algorithm is executed which includes monitoring signal inputs from the sensing devices. Parameters for a corrected exhaust flow, a pressure at a turbine outlet of the intake air compressing device 40, $P_{st}$ (also referred to as stack pressure) are determined. An exhaust pressure ratio is determined based upon the parameters comprising the corrected exhaust flow, the turbine outlet pressure of the intake air compressing device, the VGT position, and the rotational speed of the intake air compressing device. An exemplary physical model is described with reference to Eq. 1:

$$P_{ex\_est} = P_{st} * g\left(\frac{M_{ex}\sqrt{T_{ex}}}{P_{st}}, VGT_{ps}\right) \qquad [1]$$

wherein $M_{ex}$ is engine exhaust air mass flow, which is the sum of fresh air flow and fuel flow, $VGT_{ps}$ is the VGT (%-closed) position, output from the VGT position sensor 28, $T_{ex}$ is the exhaust temperature measured from sensor 24 and $P_{st}$ is the turbine outlet pressure. The exhaust pressure ratio is preferably determined from a calibration table stored in tabular form in a memory device in the ECM 5 comprising an array of predetermined pressure ratios. Alternatively, the exhaust pressure ratio is determined by execution of a polynomial equation executable by the ECM 5. Exhaust pressure is determined based upon the exhaust pressure ratio, in conjunction with a monitored pressure parameter, preferably the turbine outlet pressure $P_{st}$. An exemplary method for estimating exhaust pressure is disclosed in commonly assigned U.S. patent application Ser. No. 11/466,144, which is incorporated herein by reference.

To estimate the vane position, $VGT_{p\_est}$, a first order lag filter is applied to the VGT position command, $VGT_{cmd}$, which allows for mechanical and electrical response time delays from the command to achieving the position.

A vane position residual ($r_1$), and an exhaust pressure residual ($r_2$) are calculated based upon differences between the estimated and monitored signals. Signal processing, change detection, or pattern recognition methods are applied to a residual vector to detect and isolate different plant failure modes. Towards this end, a residual vector for this turbo charger system is generated, as depicted with reference to Eq. 2:

$$r = \begin{bmatrix} r_1 \\ r_2 \end{bmatrix} = \begin{bmatrix} VGT_{p\_est} - VGT_{ps} \\ P_{ex} - P_{ex\_est} \end{bmatrix} \qquad [2]$$

It is determined that the turbocharger and its components are operating property based upon the exhaust pressure residual and the wastegate position residual. A fault is identified in one of the components of the turbocharger based upon the exhaust pressure residual and the wastegate position residual. A plurality of fault detection rules are described hereinbelow to diagnose and identify faults in the VGT system, including component faults, based upon the residual vector. This is now described in detail.

Figure 2:
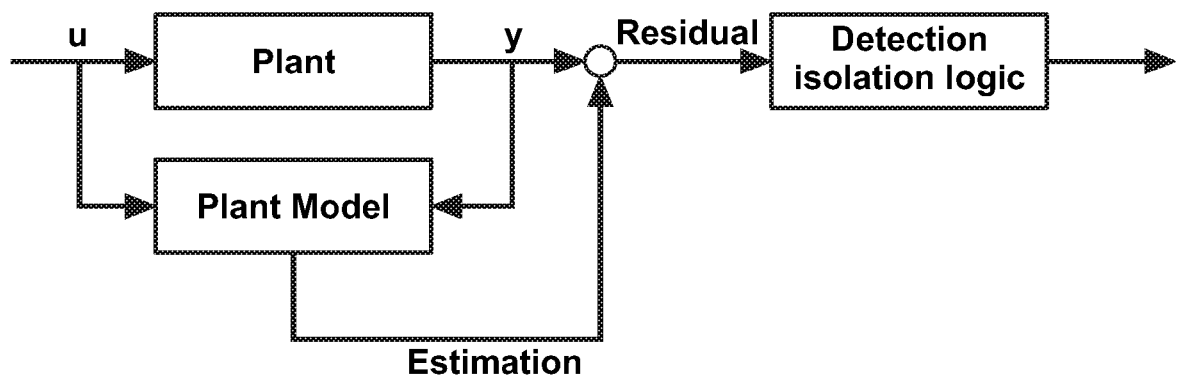
FIG. 2 is a schematic diagram of a control scheme, in accordance with an embodiment of the present invention.

Referring now to FIG. 2, a model-based diagnostic architecture to generate the residual vector of Eq. 2 from the measurements of the physical plant, i.e., the engine, and the corresponding estimates of a plant model are depicted. A plurality of control signals (u) are input to a Plant and a Plant Model, and signal outputs (y) are input to the Plant Model.

The Plant Model generates an estimated signal output (estimation). A residual is generated, comprising a difference between the signal output (y) and the estimated signal output, which is input to fault detection and isolation logic.

The model-based diagnostic described herein generates residuals $r_1$ and $r_2$ from ongoing execution of Eq. 2, and isolates faults therefrom. A series of system faults are introduced into an engine simulator generated based upon real-world engine test data to evaluate effectiveness of the model-based diagnostic algorithm. Characteristics of the simulated faults approximate real faults sufficient to permit use of simulation studies in place of on-engine experiments to save test cell time.

Figure 3:
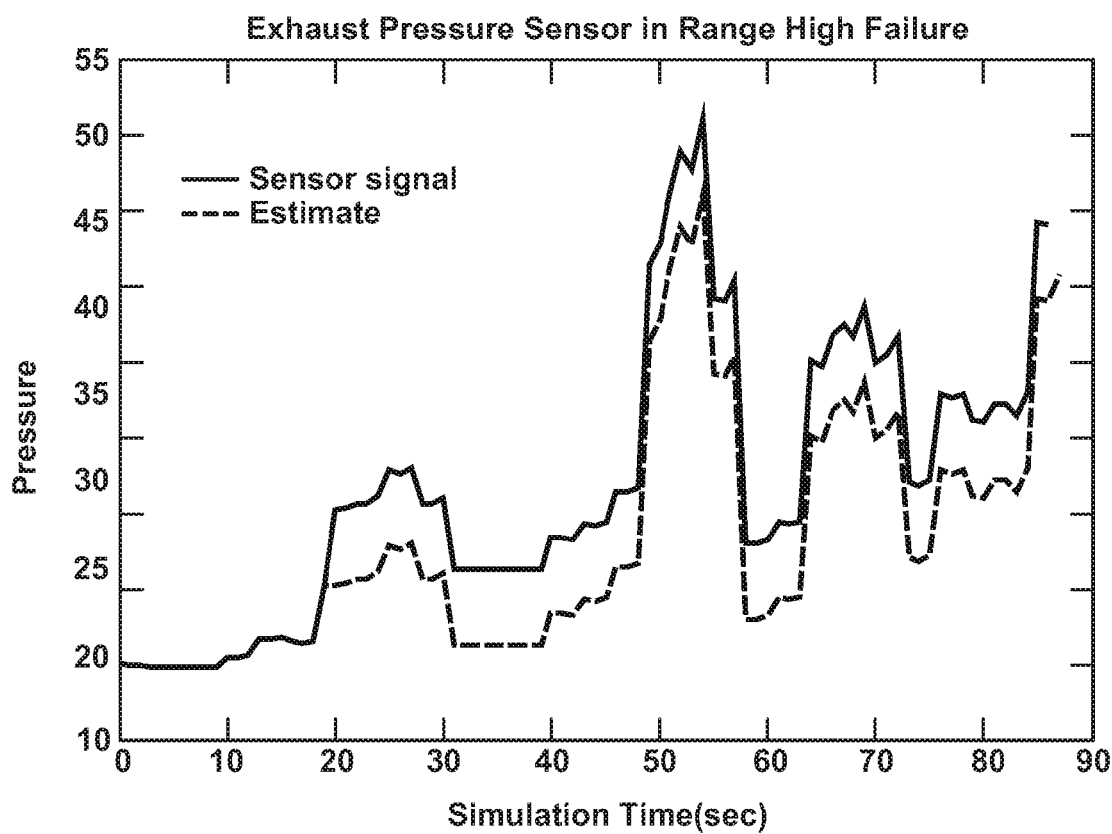
FIGS. 3-6 are graphical data depictions, in accordance with an embodiment of the present invention.

In a first application utilizing the residuals determined with reference to Eq. 2 to identify specific faults, an in-range fault of the exhaust gas pressure sensor 26 is identified. An in-range fault of the exhaust pressure sensor occurs, for example, when there is fault in a wiring harness which causes the sensor output signal to be skewed. A simulation was executed utilizing the engine simulator, as depicted with reference to FIG. 3 wherein a 5 psi (16 kPa) pressure offset was induced in the exhaust pressure signal after twenty seconds of operation. A fault detection algorithm, called a cumulative sum (CUSUM) algorithm is applied to both residuals in Eq. 2. The CUSUM algorithm is defined for the residuals $r_1$ and $r_2$ with reference to Eq. 3:

$$R_1(t) = R_1(k \cdot \Delta t) = \sum_{i=1}^{k} r_1(i) = \sum_{i=1}^{k} (VGT_{p\_est}(i) - VGT_{ps}(i)), \quad [3]$$

$$R_2(t) = R_1(k \cdot \Delta t) = \sum_{i=1}^{k} r_2(i) = \sum_{i=1}^{k} (P_{ex}(i) - P_{ex\_est}(i))$$

wherein $t=k\Delta t$, $R_1(t)$ and $R_2(t)$ are accumulated sums of the sampled residuals $r_1(i)$ and $r_2(i)$. When the VGT is working properly, its position sensor is able to track its command, and the residual $r_1(t)$ is typically near zero, thus the absolute value of $|R_1(t)|<\epsilon$, where $\epsilon>0$ is a small positive number. However, when an in range high fault is induced in the exhaust pressure sensor, the CUSUM value of $R_2(t)$ increases. Based on this, a first fault detection rule is defined as follows.

Figure 4:
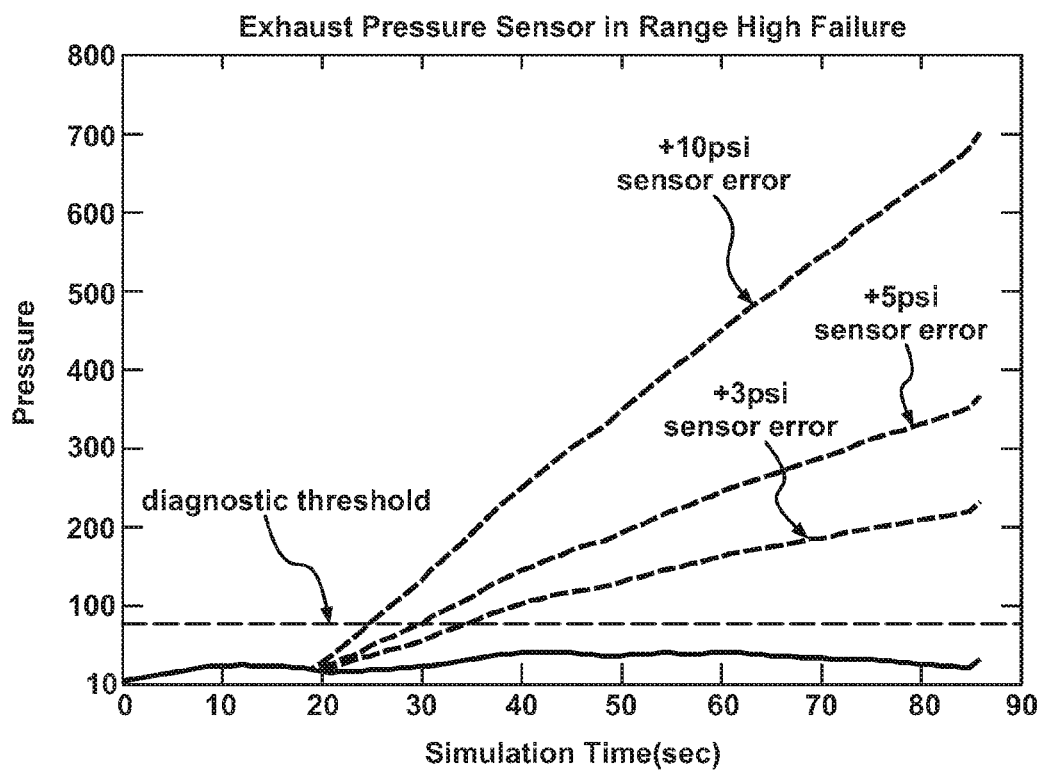

If $|R_1(t)|<\epsilon$, and the following inequality holds true: $R_2(t)>D_{TH}$ wherein $D_{TH}$ is a detection threshold, within a sampling window $t_0<t<t_N$, where $t_0$ is the initial time when $R_2(t)$ exceeds the threshold $D_{TH}$, a sensor in-range high fault is detected. This is depicted with reference to FIG. 4, for various sensor offset errors ranging from 3 psi (10 kPa) to 10 psi (33 kPa). The results demonstrate detection for different levels of sensor in range faults with different offset values. As depicted, about four seconds after a fault occurs, CUSUM is able to detect the 10 psi sensor offset fault. For a smaller level of offset fault, CUSUM takes longer time to detect it. The detection rule can be used for low in-range faults, with detection when $R_2(t)$ is less than threshold—$D_{TH}$, and similar results for detection of in-range low faults.

In a second application utilizing the residuals determined with reference to Eq. 2 to identify specific faults, detection of VGT stuck vane and VGT position sensor faults are identified. A fault of VGT vane sticking can be caused by faults in elements of the VGT device, including, e.g., an electrical H-bridge fault or a motor mechanical fault. The former is typically detected through an H-bridge diagnostic routine, but the latter could happen due to some unknown root causes, which can be difficult to detect. Both the VGT stuck fault and the position sensor fault are compounded and cause the value of the residual r, to increase. From an abrupt change in the residual $r_1$ alone, it is difficult to distinguish both faults. However, these faults can be further isolated utilizing sensor fusion in terms of a relationship between the residuals $r_1$ and $r_2$. Correspondingly, a second fault detection and isolation rule is defined as follows.

Figure 5:
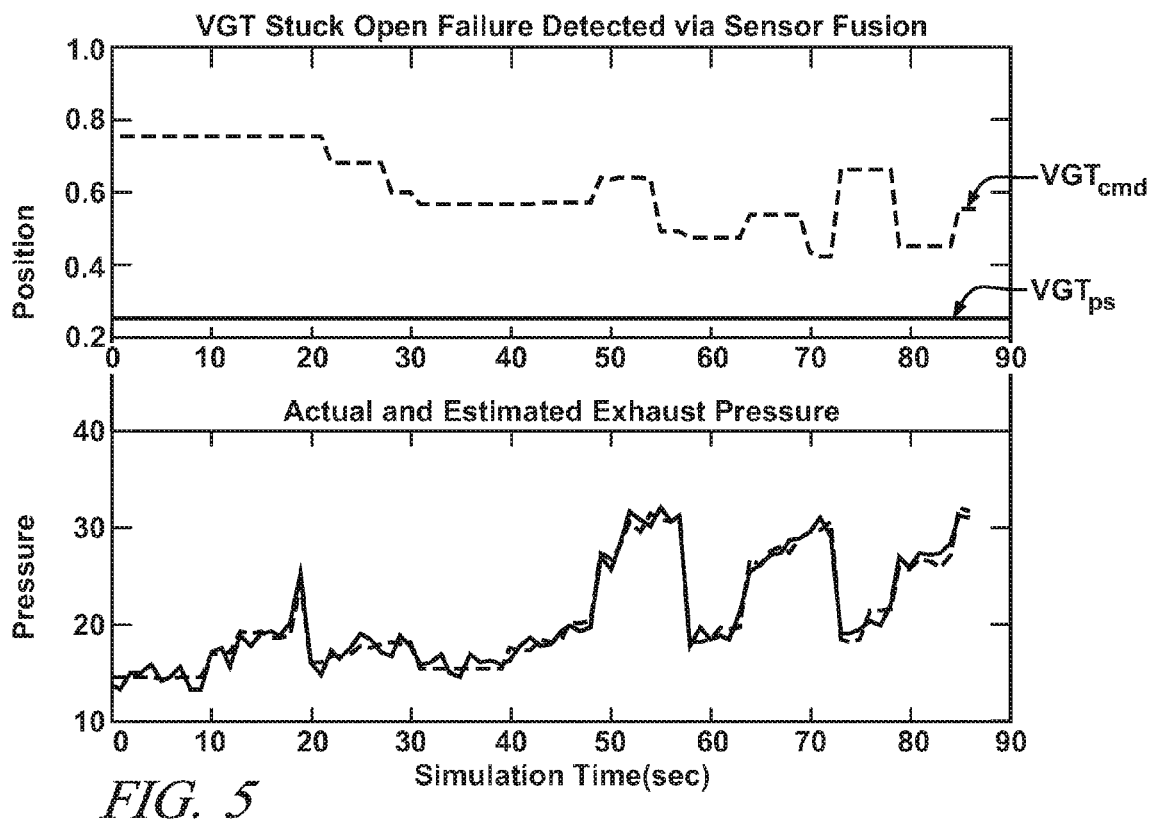

If $|R_2(t)|<\epsilon$, and the following inequality holds true, $R_1(t)>D_{1TH}$ wherein $D_{1TH}$ is a detection threshold, within a sampling window $t_0<t<t_N$, wherein $t_0$ is the initial time when $R_1(t)$ exceeds the threshold $D_{1TH}$, then the control system determines the VGT vane is stuck open. FIG. 5 depicts the time responses of the corresponding parameters, $VGT_{p\_est}$, $VGT_{ps}$, $P_{ex}$, $P_{ex\_est}$, which demonstrate that the VGT vane is stuck at 25% closed position, while the filtered VGT command, $VGT_{cmd}$ is changing between 40–80% closed position. Since the VGT position sensor works normally, it measures VGT position accurately, and the estimated exhaust pressure accurately tracks the measured pressure. As a result, the residual $r_2$ remains around zero, so is CUSUM $R_2(t)$. A similar diagnostic rule is used to detect a fault when the VGT stuck closed.

A third fault detection and diagnostic rule is established to detect a VGT position sensor fault, as follows.

If CUSUM $|R_1(t)|>D_{1TH}$, for all $t_0<t<t_N$, and CUSUM $|R_2(t)|>D_{2TH}$, for all $t_0<t<t_N$, where $t_0$ is the initial time when $R_2(t)$ crosses the threshold $D_{2TH}$, then the VGT position sensor is diagnosed as failed.

Figure 6:
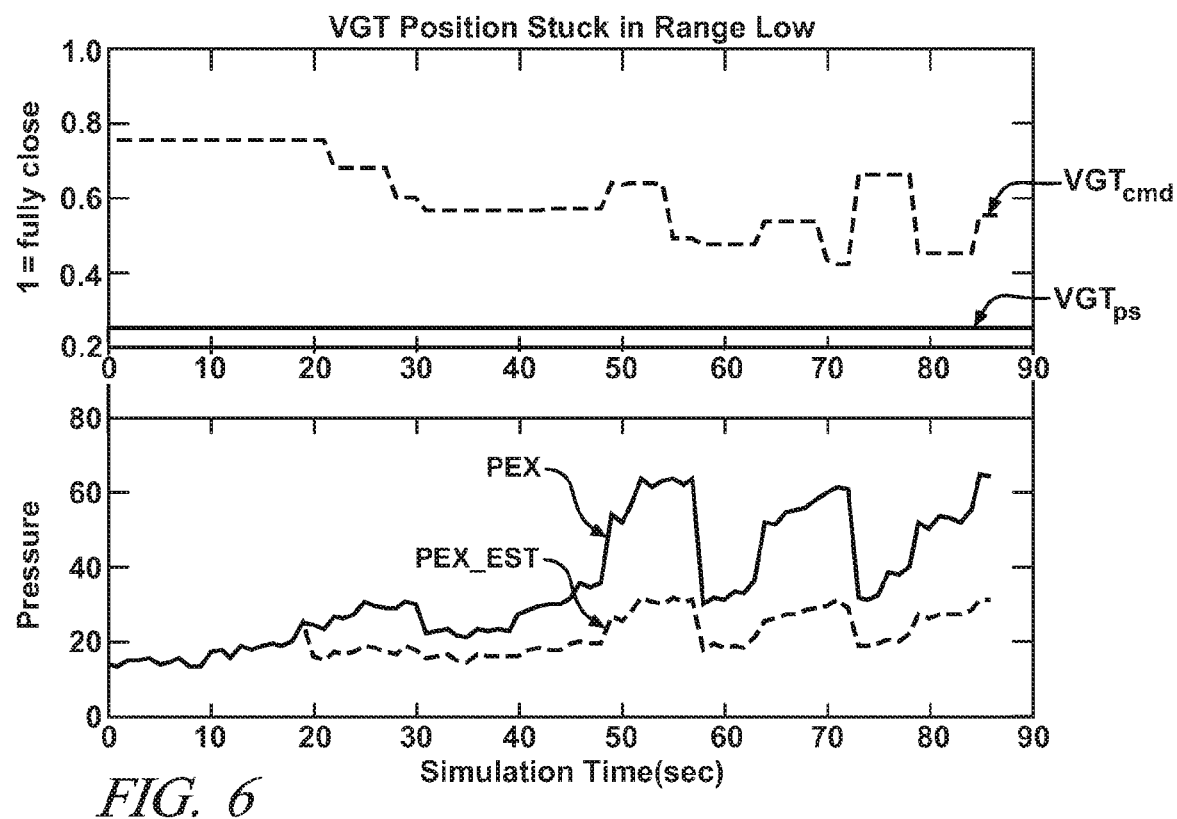

Referring now to FIG. 6, results of simulation with the VGT position sensor having an in-range failure stuck at the 25% close VGT position are shown. This fault can occur, e.g., when the position sensor is a potentiometer-based device. The filtered VGT position command varies from 40 to 80% closed position. Because of a positive control error between the VGT command and the position measurement, a closed-loop PI control based on the position feedback drives the VGT vane to a fully closed limit, causing the exhaust pressure to increase. The estimated exhaust pressure, however, is lower than the actual pressure because of incorrect readings from the VGT position sensor, as depicted.

Figure 7:
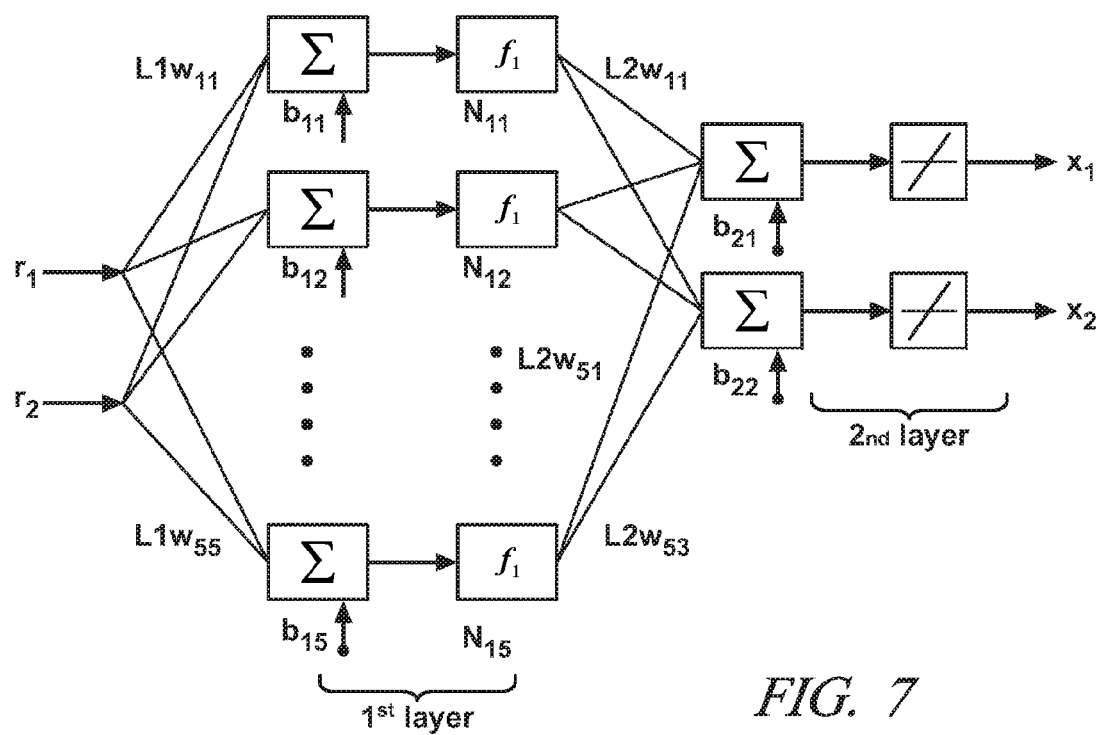
FIG. 7 is a schematic diagram of a neural network, in accordance with an embodiment of the present invention; and, FIGS. 8-11 are graphical data depictions, in accordance with an embodiment of the present invention.

Referring now to FIG. 7, a two-dimensional neural network (NNT) is created and adapted to execute pattern recognition to identify and isolate specific faults based upon inputs of $r_1$ and $r_2$. The time series of the residual data from $r_1$ and $r_2$ are fed into the first layer of the NNT. The second layer of NNT has two outputs $x_1$ and $x_2$. The NNT is trained by the residual data from $r_1$ and $r_2$ in terms of different characteristics of failure modes. And, it maps those faults into different locations in a 2-D output plan, as depicted with reference to Table 1, below:

TABLE 1

| Failure mode | $r_1$ | $r_2$ | $x_1$ | $x_2$ |
| --- | --- | --- | --- | --- |
| None | ≈0 | ≈0 | 0 | 0 |
| exhaust pressure sensor in range high | ≈0 | >>0 | 0 | 10 |
| exhaust pressure sensor in range low | ≈0 | <<0 | 0 | −10 |
| VGT stuck open | >>0 | ≈0 | 10 | 0 |
| VGT stuck close | <<0 | ≈0 | −10 | 0 |
| VGT position sensor in range low | >>0 | >>0 | 10 | 10 |
| VGT position sensor in range high | <<0 | <<0 | −10 | −10 |

Figure 8:
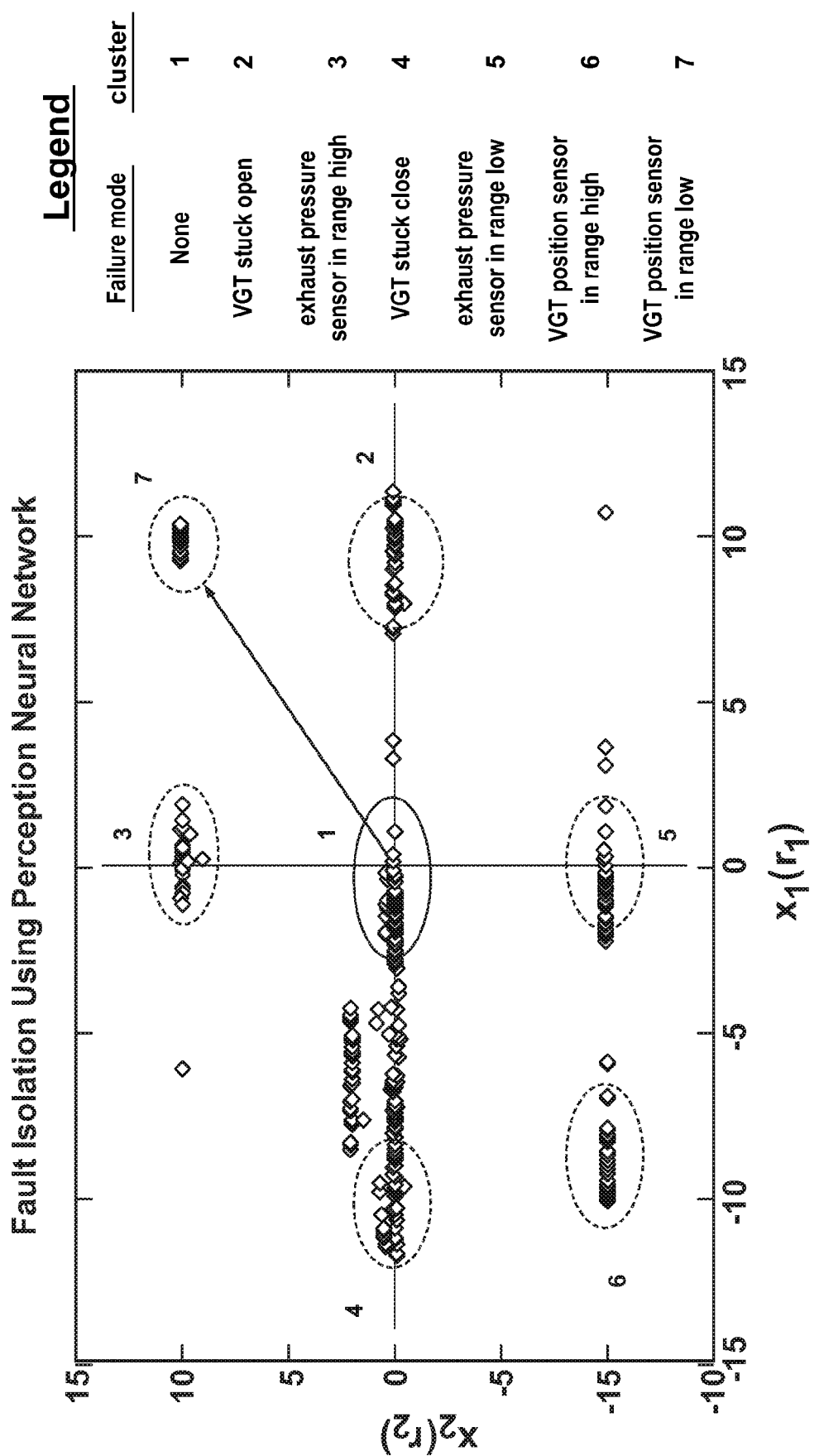

Once the NNT is trained, it identifies and isolates the failure modes in a recognized pattern in terms of fed-in data from the residuals $r_1$ and $r_2$, as depicted with reference to FIG. 8. Thus, as an alternative to applying hypothesis testing on the individual residuals, the NNT-based diagnostics provides a straightforward visual display to identify a fault by the location of a data cluster, depicted in FIG. 8. For example, when the output pair $(x_1, x_2)$ of the NNT falls into cluster 1 or around its vicinity, the turbo charger system works properly. And, when the output pair falls into cluster 2, it detects the VGT having a stuck open fault. When the output pair falls into cluster 3, it detects the exhaust pressure sensor having an in-range high fault. When the output pair falls into cluster 4, it detects the VGT having a stuck closed fault. When the output pair falls into cluster 5, it detects the exhaust pressure sensor having an in-range low fault. When the output pair falls into cluster 6, it detects the VGT position sensor having an in-range high fault. When the output pair falls into cluster 7, it detects the VGT position sensor with an in-range low fault. Noise data is preferably generated to train the NNT to minimize false and missing alarms, thus increasing the fidelity of fault detection.

Figure 9:
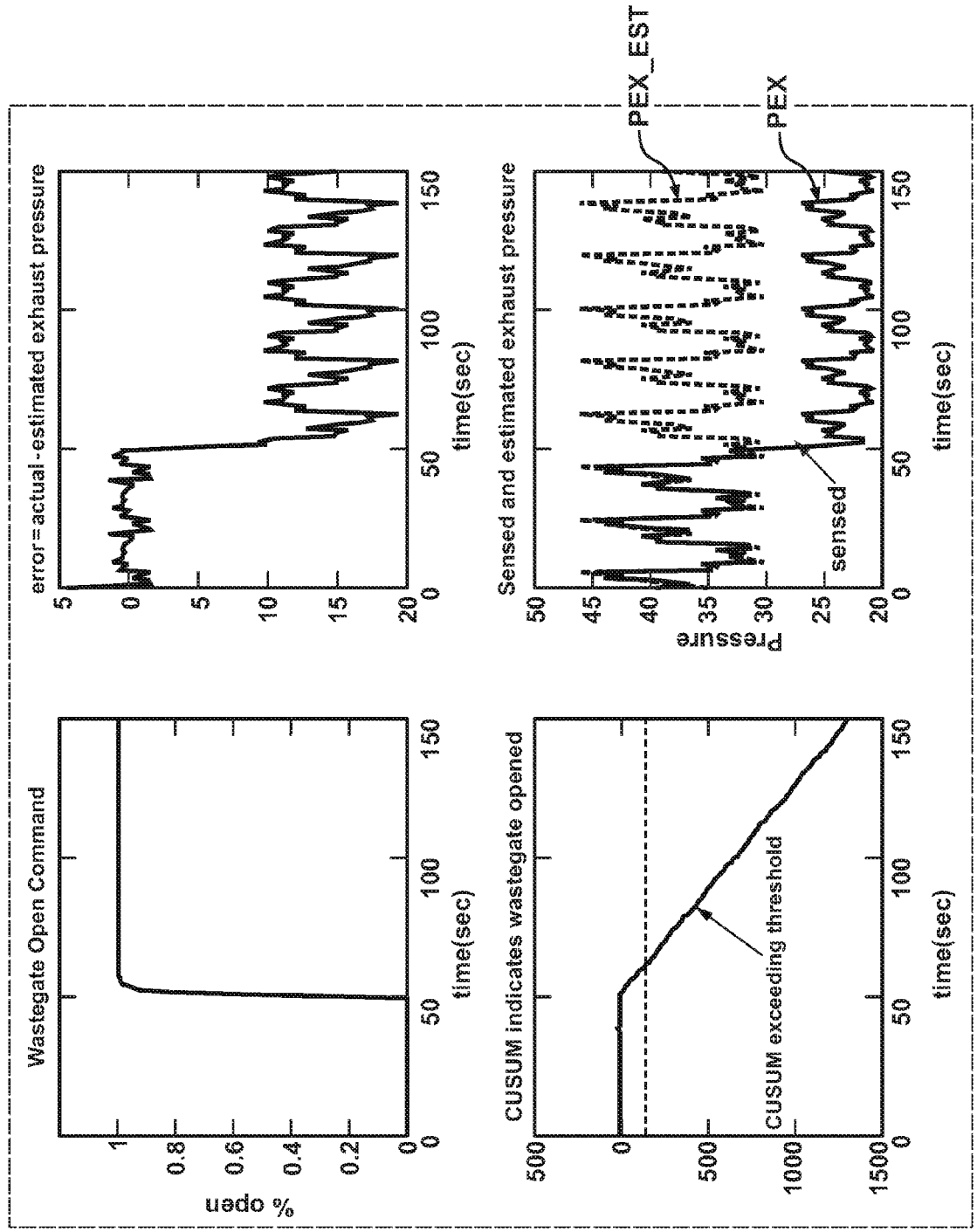
Figure 10:
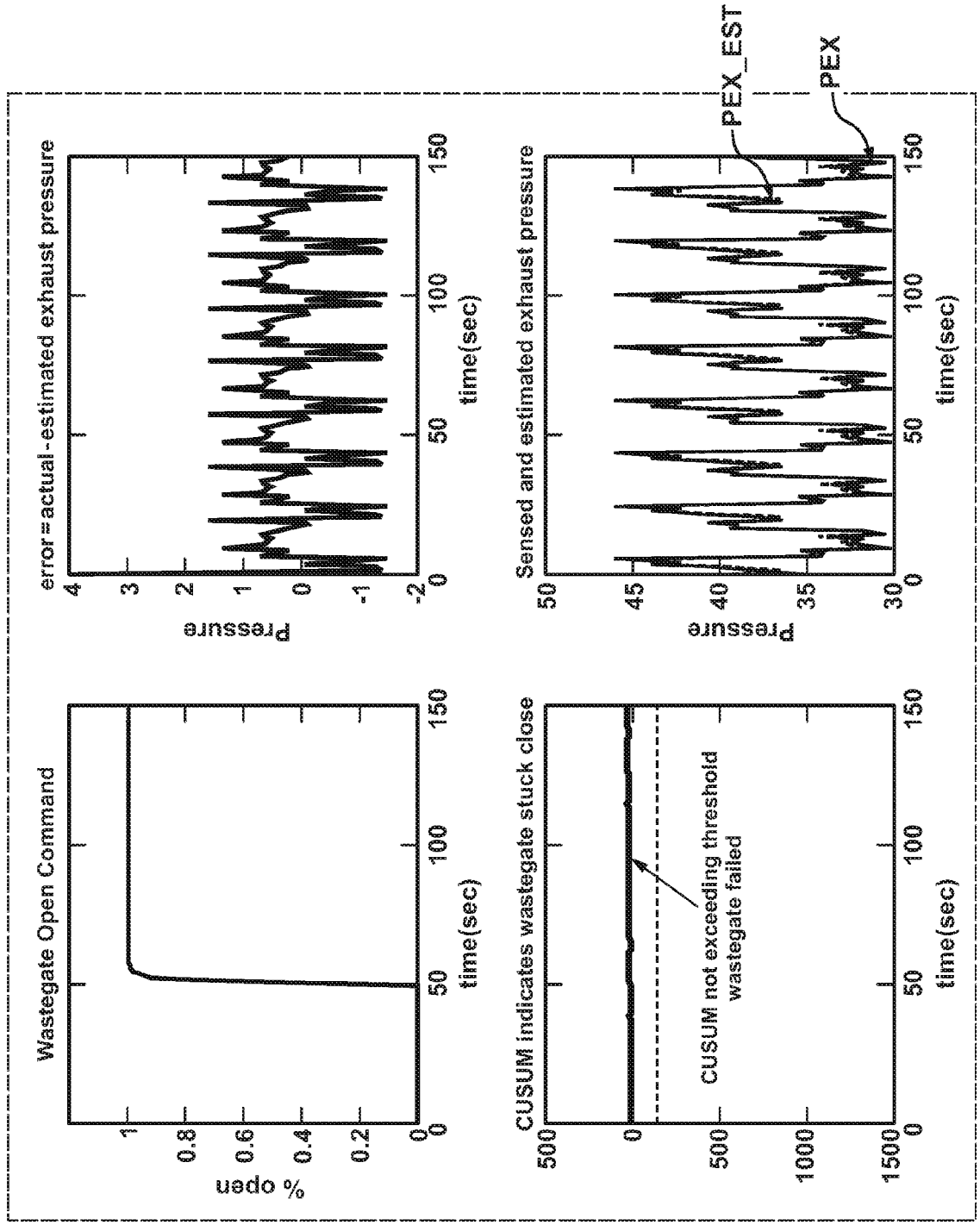

The turbo-charger system may utilize a wastegate to bypass a portion of engine exhaust flow to reduce boost pressure under specific operating conditions. As a result, it reduces high peak cylinder pressure to protect an engine. The wastegate can also be used to modulate the amount of EGR. For cost reduction purposes, such a wastegate often does not have a position sensor feedback. Instead, it is controlled by an on/off valve modulated by a PWM signal. With an exhaust pressure virtual sensor, a wastegate stuck fault can be detected by monitoring the residual $r_2$ in response to a wastegate command. When the wastegate is opened, the engine exhaust pressure will drop. During a transient operation, it may be difficult to detect this pressure drop, because the rapid change of engine load may cause a pressure drop as well. The virtual sensor tracks the transient exhaust pressure when the wastegate is closed. Therefore, a drop in pressure due to the opened wastegate causes an abrupt change in the residual signal $r_2$. Although the opened wastegate has bypassed a portion of the exhaust flow, the virtual sensor uses the total exhaust flow as its input, and the estimated exhaust pressure is much higher than the actual. Based on this, the following detection and diagnostic rules are generated to isolate different wastegate faults. When the wastegate is closed, and a command is given to open the wastegate, a time $t_0$ is defined after the wastegate command is fully open. If the CUSUM $R_2(t) <- T_{TH}$, for all $t_0 < t < t_N$, wherein $T_{TH} > 0$ is a defined threshold, the wastegate opens properly, as depicted with reference to FIG. 9. If the CUSUM $|R_2(t)| < \epsilon$, $\epsilon > 0$ is a small number, for all $t_0 < t < t_N$, the wastegate fails to open or has a stuck close fault, as depicted with reference to FIG. 10.

Figure 11:
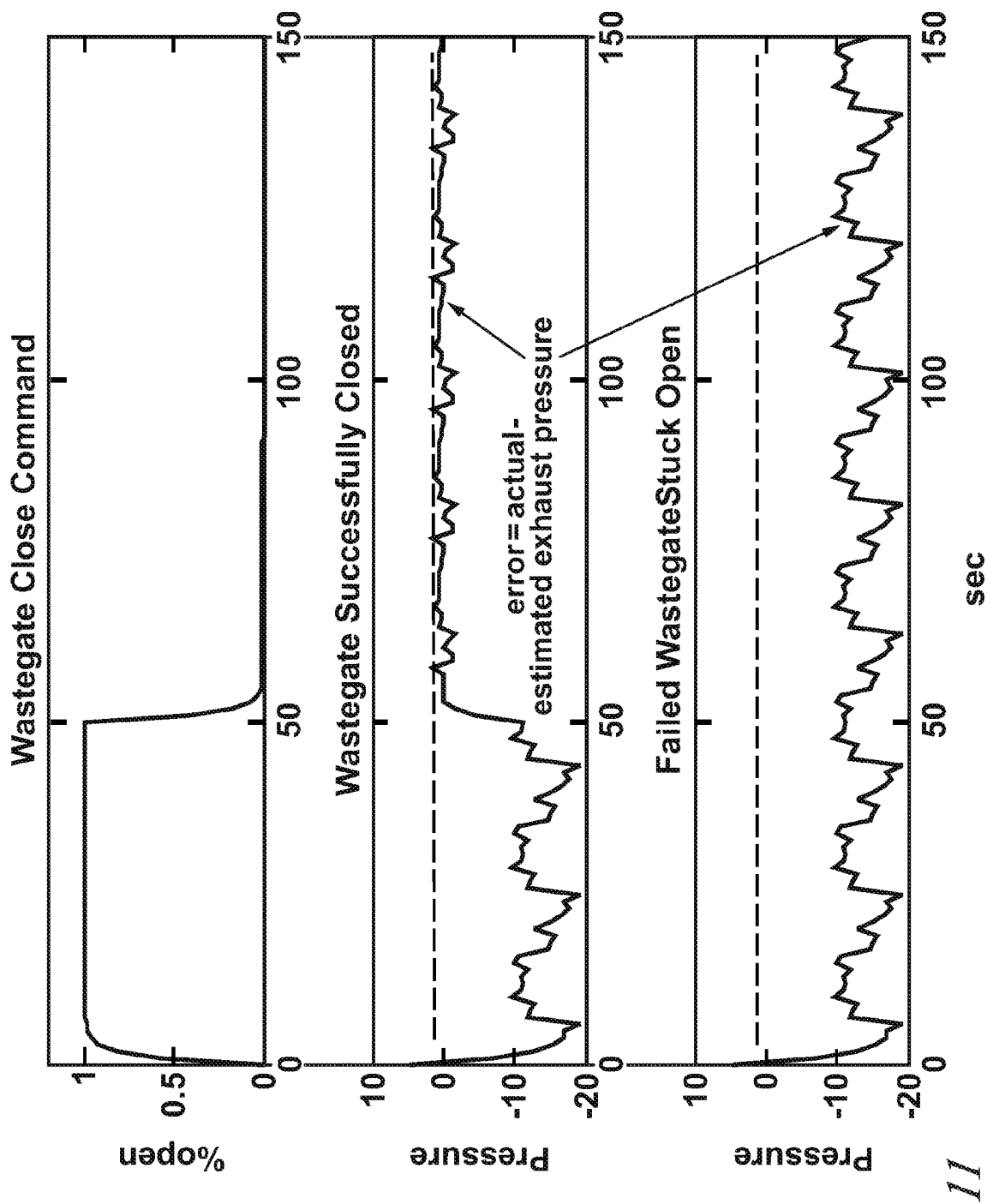

Similarly, when the wastegate is open, and a command is given to close the wastegate, a time $t_0$ is defined after the wastegate command is fully closed. If the CUSUM $|R_2(t)| < \epsilon$, $\epsilon > 0$, a small number, for all $t_0 < t < t_N$, the wastegate is successfully closed. If the CUSUM $R_2(t) <- D_{TH}$, for all $t_0 < t < t_N$, where $D_{TH} > 0$ is a diagnostic threshold, then the wastegate fails to close or has a stuck open fault. This is depicted with reference to FIG. 11.

Specific control operations are implemented to prevent engine damage, in the event a VGT fault is identified. This includes reducing mass of fuel injected into each cylinder during such operation to prevent excessive peak cylinder pressures and reducing engine-out emissions, including controlling air/fuel ratio of the engine.

The model-based approach described estimates engine exhaust pressure for both diesel and gasoline engines equipped with variable geometry turbo chargers and wastegates for engines with an exhaust pressure sensor, to develop model-based diagnostic algorithms that are capable of detecting and isolating turbo charger and wastegate faults during ongoing operation of the engine.

The invention has been described with specific reference to the disclosed embodiments and modifications thereto. Further modifications and alterations may occur to others upon reading and understanding the specification. It is intended to include all such modifications and alterations insofar as they come within the scope of the invention.

The invention claimed is:

1. A method for monitoring operation of a variable geometry turbocharger device, comprising:
    applying a plurality of control signals to an engine system including said variable geometry turbocharger device;
    monitoring exhaust gas pressure and vane position of the variable geometry turbocharger device;
    estimating an exhaust pressure and a vane position based on the control signals and the monitored exhaust gas pressure and vane positions;
    calculating an exhaust pressure residual and a vane position residual based upon differences between the estimated exhaust gas pressures and vane positions and the monitored exhaust gas pressures and vane positions; and,
    determining the turbocharger is operating properly based upon the exhaust pressure residual and the vane position residual.

2. The method of claim 1, wherein determining the turbocharger is operating properly further comprises determining components of the turbocharger are operating properly based upon the exhaust pressure residual and the vane position residual.

3. The method of claim 1, further comprising identifying a fault in a component of the turbocharger based upon the exhaust pressure residual and the vane position residual.

4. The method of claim 3, further comprising mitigating effects of the identified fault in the component of the turbocharger to prevent damage to an engine attached thereto.

5. The method of claim 3, wherein identifying the fault in a component of the turbocharger based upon the exhaust pressure residual and the vane position residual comprises calculating cumulative sums of the exhaust pressure residual and the vane position residual over a period of time, and comparing the cumulative sums to thresholds.

6. The method of claim 5, comprising identifying an in-range fault in the exhaust pressure sensor when the cumulative sum of the exhaust pressure residual surpasses a threshold.

7. The method of claim 5, comprising identifying a position sensor fault when the cumulative sum of the vane residual surpasses a threshold.

8. The method of claim 1, wherein estimating an exhaust pressure comprises:
    determining an exhaust flow mass and vane opening position of the variable geometry turbocharger;
    determining an exhaust pressure ratio based upon the exhaust flow and the opening of the intake air compressing device; and,
    determining exhaust pressure based upon the exhaust pressure ratio.

9. A method for monitoring operation of a variable geometry turbocharger device, comprising:

monitoring exhaust gas pressure and vane position of the variable geometry turbocharger device;

estimating an exhaust pressure and a vane position;

calculating an exhaust pressure residual and a vane position residual based upon differences between the estimated and monitored exhaust gas pressures and vane positions;

determining the turbocharger is operating properly based upon the exhaust pressure residual and the vane position residual; and, identifying a fault in a component of the turbocharger based upon the exhaust pressure residual and the vane position residual comprising identifying and isolating component faults comprising stuck vanes, vane position sensor in-range, exhaust pressure sensor in-range, and a stuck wastegate bypass valve.

10. A method for monitoring operation of a variable geometry turbocharger device, comprising:

monitoring exhaust gas pressure and vane position of the variable geometry turbocharger device;

estimating an exhaust pressure and a vane position;

calculating an exhaust pressure residual and a vane position residual based upon differences between the estimated and monitored exhaust gas pressures and vane positions;

determining the turbocharger is operating properly based upon the exhaust pressure residual and the vane position residual;

identifying a fault in a component of the turbocharger based upon the exhaust pressure residual and the vane position residual comprising calculating cumulative sums of the exhaust pressure residual and the vane position residual over a period of time, and comparing the cumulative sums to thresholds; and, identifying a vane-stuck fault when the cumulative sum of the vane residual surpasses a threshold.

11. A method for monitoring operation of an internal combustion engine equipped with a variable geometry turbocharger, comprising:

applying a plurality of control signals to the internal combustion engine;

monitoring signals output from an exhaust pressure sensor and a vane position sensor for the variable geometry turbocharger;

estimating an engine exhaust pressure signal and a vane position signal based on the control signals and the monitored signals output from the exhaust pressure sensor and the the vane position sensor;

calculating an exhaust pressure residual and a vane position residual based upon differences between the monitored signals and estimated signals; and, identifying a fault in a component of the turbocharger based upon the exhaust pressure residual and the vane position residual.

12. A method for monitoring operation of an internal combustion engine equipped with a variable geometry turbocharger, comprising:

monitoring signals output from an exhaust pressure sensor and a vane position sensor for the variable geometry turbocharger;

estimating an engine exhaust pressure and a vane position;

calculating an exhaust pressure residual and a vane position residual based upon differences between the monitored and estimated signals; and, identifying a fault in a component of the turbocharger based upon the exhaust pressure residual and the vane position residual wherein identifying the fault in a component of the turbocharger comprises identifying and isolating component faults in vanes of the variable geometry turbocharger, the vane position sensor, an exhaust pressure sensor, and a wastegate bypass valve.

13. The method of claim 12, further comprising identifying and isolating a stuck vane for the variable geometry turbocharger based upon the exhaust pressure residual and the vane position residual.

14. The method of claim 12, further comprising identifying and isolating an in-range fault for the vane position sensor based upon the exhaust pressure residual and the vane position residual.

15. The method of claim 12, further comprising identifying and isolating a wastegate fault based upon the exhaust pressure residual and the vane position residual.

16. The method of claim 12, further comprising identifying and isolating an in-range fault for the exhaust pressure sensor based upon the exhaust pressure residual and the vane position residual.

17. An article of manufacture, comprising a storage medium having a computer program encoded therein and operative to monitor operation of a variable geometry turbocharger device for an internal combustion engine, the program comprising:

code to apply a plurality of control signals to the internal combustion engine;

code to monitor signals output from an exhaust pressure sensor and a vane position sensor for the variable geometry turbocharger device;

code to estimate an engine exhaust pressure signal and a vane position signal based on the control signals and the monitored signals output from the exhaust pressure sensor and the vane position sensor;

code to calculate an exhaust pressure residual and a vane position residual based upon differences between the monitored and estimated signals;

code to determine components of the turbocharger are operating properly based upon the exhaust pressure residual and the vane position residual; and, code to identify a fault in the turbocharger based upon the exhaust pressure residual and the vane position residual.

18. The article of claim 17, wherein the code to identify the fault in a component of the turbocharger based upon the exhaust pressure residual and the vane position residual comprises code to calculate cumulative sums of the exhaust pressure residual and the vane position residual over a period of time, and compare the cumulative sums to thresholds.

19. A method for monitoring operation of a variable geometry turbocharger device, comprising:

monitoring exhaust gas pressure and vane position of the variable geometry turbocharger device;

estimating an exhaust pressure and a vane position;

calculating an exhaust pressure residual and a vane position residual based upon differences between the estimated and monitored exhaust gas pressures and vane positions;

determining the turbocharger is operating properly based upon the exhaust pressure residual and the vane position residual;

identifying a fault in a component of the turbocharger based upon the exhaust pressure residual and the vane position residual wherein identifying the fault comprises calculating cumulative sums of the exhaust pressure residual and the vane position residual over a period of time, and comparing the cumulative sums to thresholds; and, identifying a wastegate fault when the cumulative sum of the exhaust pressure residual surpasses a threshold subsequent to a command to open the wastegate.

* * * * *